(No Model.) 2 Sheets—Sheet 1.
T. A. WESTON.
FRICTION CLUTCH.
No. 523,874. Patented July 31, 1894.
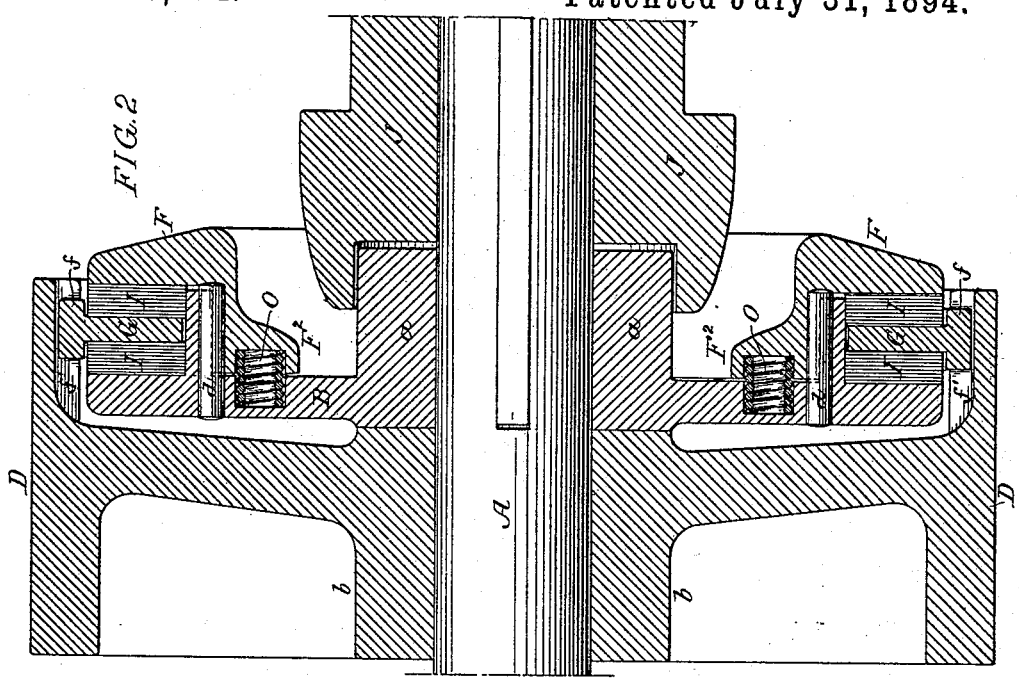
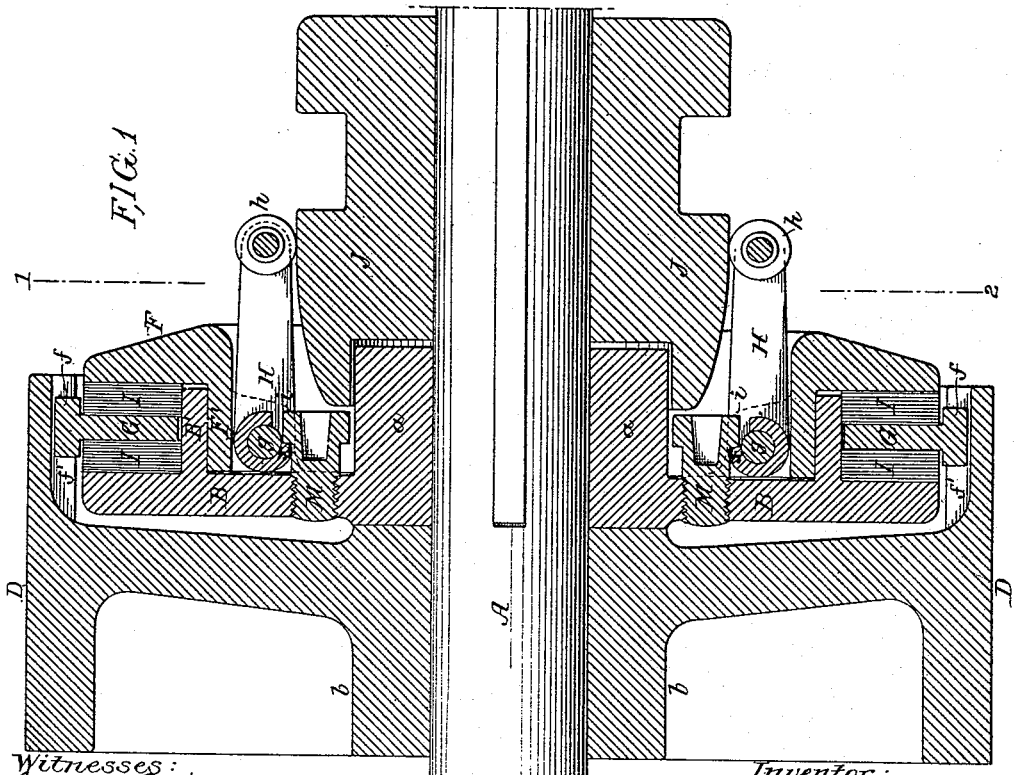
Witnesses:
Hamilton D. Turner.
A. V. Groupe.
Inventor:
Thomas A. Weston
by his Attorneys Howson & Howson
THE NORRIS PETERS CO., PHOTO-LITHO., WASHINGTON, D. C.

(No Model.) 2 Sheets—Sheet 2.

T. A. WESTON.
FRICTION CLUTCH.

No. 523,874. Patented July 31, 1894.

Witnesses:
Hamilton D. Turner
A. V. Groupe

Inventor:
Thomas A. Weston
by his Attorneys
Howson & Howson

UNITED STATES PATENT OFFICE.

THOMAS A. WESTON, OF STAMFORD, CONNECTICUT.

FRICTION-CLUTCH.

SPECIFICATION forming part of Letters Patent No. 523,874, dated July 31, 1894.

Application filed July 27, 1889. Serial No. 318,838. (No model.)

*To all whom it may concern:*

Be it known that I, THOMAS A. WESTON, a citizen of the United States, and a resident of Stamford, Connecticut, have invented certain Improvements in Friction-Clutches, of which the following is a specification.

One object of my invention is to so construct a friction-clutch that, with the minimum of parts, an extremely compact and powerful clutch is obtained, a further object being to so construct the parts of the clutch that they will mutually strengthen or stiffen each other and thus prevent any interference with the proper action of the clutch due to buckling or springing of either of the elements of the clutching mechanism. These object I attain in the manner hereinafter set forth, reference being had to the accompanying drawings, in which—

Figure 3:
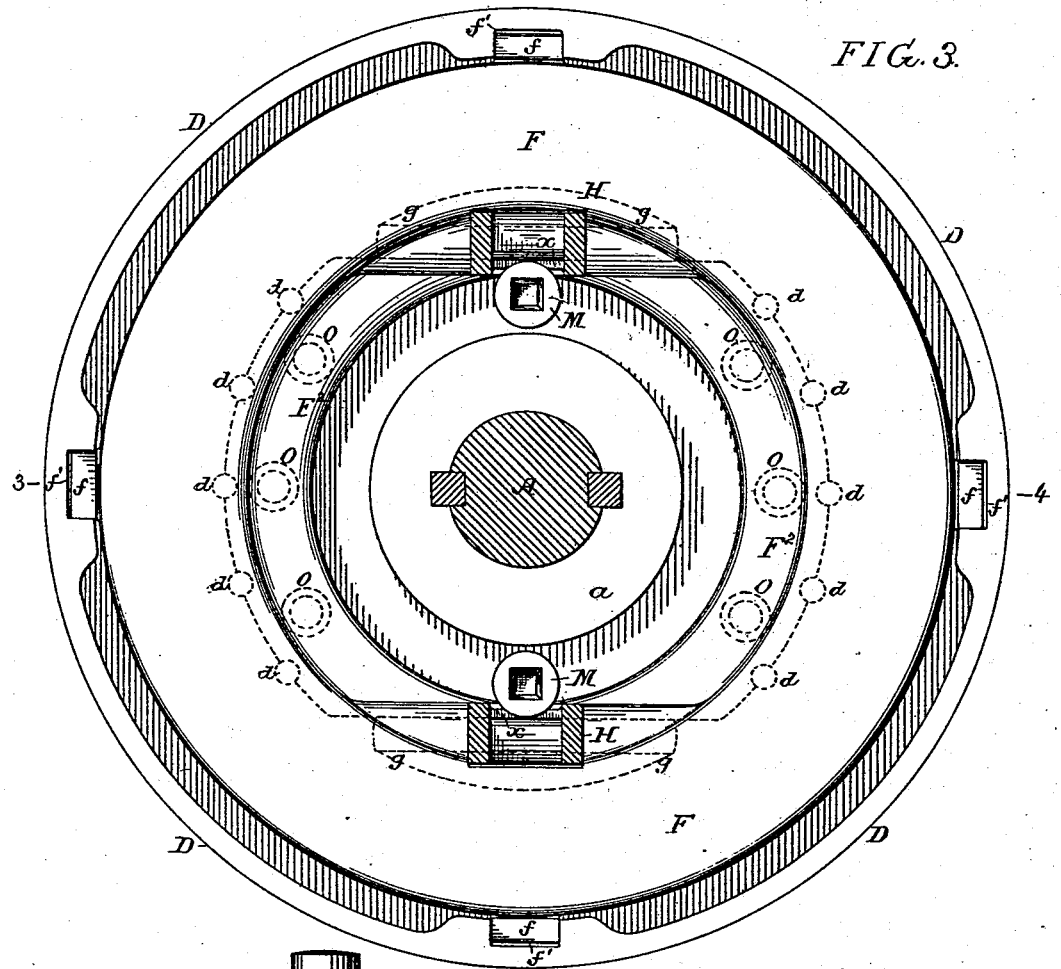
Figure 4:
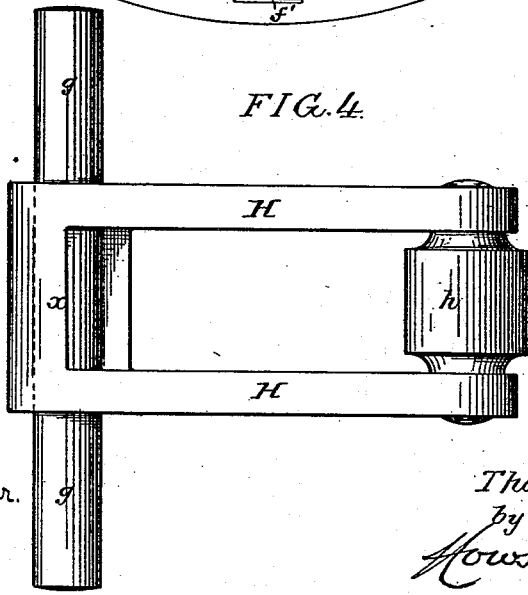

Figure 1, is a longitudinal section of a friction clutch constructed in accordance with my invention. Fig. 2, is a sectional plan view on the line 3—4, Fig. 3. Fig. 3, is a sectional view of the clutch on the line 1—2, Fig. 1, showing the greater portion of the clutch in elevation and omitting the clutch operating collar or sleeve; and Fig. 4, is a detached view of one of the clutch operating levers.

In the clutch shown in Figs. 1 to 3, A is a shaft, to which is keyed or otherwise rigidly secured the hub $a$ of a driving disk B, and running loosely on the shaft is the hub $b$ of a wheel or disk D, which may be either a pulley for receiving a belt, or may be toothed externally so as to form one of a pair or train of gears, the power being transmitted either from this loose wheel or disk through the clutching devices and the disk B to the shaft A, or being transmitted from the shaft A through the disk B and the clutching devices to the wheel or disk D.

Projecting from the face of the disk B is an annular flange B', to which fits snugly a similar flange F' on the follower ring F of the clutch, these flanges being free to move longitudinally the one upon the other, but being prevented from having any independent circumferential movement by a series of keys or locking pins $d$ engaging with openings or recesses formed in the adjacent faces of the flanges as shown in Figs. 2 and 3, although, as will be evident, the circumferential retention of the flanges of the driving disk and follower ring may be effected by other means, as for instance, by making the flanges polygonal, or of some other than circular contour.

Both the disk B and follower ring F are provided with loose friction rings I, of wood or other appropriate material, and between these rings is interposed a clutch ring G, which has around its periphery a series of projecting tongues $f$ adapted to recesses $f'$ formed in the inner face of the flange of the wheel D, so that the clutch ring G is keyed to said wheel but is free to move longitudinally in respect thereto, although it may be fixed if desired.

Suitable lugs on the under side of the flange F' of the follower ring F carry pivot pins $g$, to which are hung the clutch actuating levers H, two of these levers, located diametrically opposite each other, being shown in the present instance, although it will be evident that three or more of the levers equidistantly located, may be used if desired, or one lever only may suffice in some cases.

The head of each lever is cut or recessed down to the circumferential line of the pivot pin so as to provide for the exercise of a high degree of power with the use of a short lever, thus insuring compactness and the exercise of a powerful clutching effect without the use of the long levers or systems of compound levers ordinarily required.

The outer end of each lever H is, in the present instance, provided with an antifriction roller $h$, which is acted on by the tapered or conical surface of a sliding sleeve or collar J, the latter being free to be moved longitudinally on the shaft A by means of the usual forked lever or equivalent device, and being preferably splined for the reception of the key which extends beyond the hub of the disk B, whereby the sleeve or collar rotates with and preserves at all times, the same circumferential relation to said disk and to the parts rotating therewith.

The acting face $x$ of each lever H engages with the overhanging head or flange $i$ of a screw pin M, which is adapted to a threaded opening in the disk B, and is recessed for the reception of a suitable implement, whereby it may be turned so as to apply it to or remove it from the disk, or adjust it in respect to the disk.

A series of springs O are adapted to recesses formed in the inner face of the disk B, and in a rib F² formed around the flange F', the tendency of these springs being to force the follower ring F longitudinally away from the disk B, and thus cause the pins M to so act upon the levers H as to throw the outer ends of said levers inward toward the shaft A when the sliding sleeve or collar J is withdrawn, the clutching ring G, being, under these circumstances, free from intimate frictional contact with the friction rings I, and the ring G being, hence, at liberty to rotate independently of the disk B, or the latter being free to rotate without imparting corresponding movement to the ring G. When, however, the sliding sleeve or collar J is advanced so as to act upon the antifriction rollers h and press outward the outer ends of the levers H, the contact of the acting faces of the levers with the heads of the fixed pins M causes the follower ring F to be forced toward the disk B with a power commensurate with the ratio of the long and short radii of the levers, the result being an intimate frictional contact between the rings I and the ring G, and a rotation of all of the parts together.

The formation of the engaging flanges B' and F' upon the driving disk B and follower ring F imparts to said ring and disk great stiffness against the buckling strain of the clutching levers, and insures the accurate guiding and true parallelism of the follower ring in respect to the driving disk, and also increases the durability of the parts under wear.

The driving disk and follower ring of my improved clutch are united operatively, and actuated by means of lever mechanism approximately longitudinal to the shaft, and fulcrumed within the inner circumference of the friction faces, the levers thus occupying the central part or body of the clutch, where the friction surfaces would be least effective from lack of diameter, and where nearness to the shaft allows the said lever to be conveniently and directly actuated by the wedge inclines of the usual sliding collar on the shaft. Upon withdrawing the sleeve or collar J, the pins M can be readily removed and the follower ring F and its attached parts, the springs O, outer ring I, clutch ring G, and inner ring I, successively withdrawn for cleansing or renewal, the only parts requiring probable renewal being the rings I, which, however, are inexpensive and indefinitely durable under fair conditions of working.

Although I have shown but one clutching ring G, it is obvious that my present invention is applicable to clutches having a series of such rings, as in my Patent No. 396,315, dated January 15, 1889.

In some of the claims I have alluded to the driving disk and the follower ring as the two clutching elements, these being in effect the clutching agents while the ring G is the inert or clutched element of the device.

Having thus described my invention, I claim and desire to secure by Letters Patent—

1. The combination of the shaft, the two gripping disks, and the intermediate friction ring of a disk friction clutch, with a lever hung to one of said gripping disks and acting upon the other, said lever having its fulcrum and bearing point between the shaft and the frictional clutching surfaces, and longitudinally within the limits of the gripping disks, substantially as specified.

2. The combination of the shaft, the two gripping disks, and the intermediate friction ring of a disk friction clutch, with a lever hung to one of said gripping disks and an adjustable projection upon the other disk acted upon by the lever, said lever being fulcrumed between the shaft and the frictional clutching surfaces, and having its acting portion extending inward to the journal, substantially as specified.

3. The combination of the friction ring and the two gripping disks of a disk friction clutch, having engaging or telescoping flanges diametrically within the frictional clutching surfaces, and a lever hung to one of said gripping disks and acting upon the other, substantially as specified.

4. The combination of the shaft, the friction ring and the two gripping disks of a disk friction clutch, having engaging or telescoping flanges diametrically within the frictional clutching surfaces, and a lever hung to one of said disks and acting upon the other, said lever being fulcrumed between the shaft and the telescoping flanges, substantially as specified.

5. The combination of the shaft, the wheel, the driving gripping disk, a second gripping disk having a flange engaging with that of the driving disk, the friction ring confined circumferentially to but free to move longitudinally on the wheel, a lever carried by one of the gripping disks, and a projection carried by the other disk and engaging with said lever, substantially as specified.

In testimony whereof I have signed my name to this specification in the presence of two subscribing witnesses.

THOS. A. WESTON.

Witnesses:
JOHN J. GEARY,
HARRY SMITH.

Correction in Letters Patent No. 523,874.

It is hereby certified that Letters Patent No. 523,874, granted July 31, 1894, upon the application of Thomas A. Weston, of Stamford, Connecticut, for an improvement in "Friction-Clutches, were erroneously issued to said Weston as owner of said invention; whereas said Letters Patent should have been issued to *The Yale and Towne Manufacturing Company, of same place*, said Yale and Towne Manufacturing Company being assignee of the entire interest in said invention as shown by the assignments of record in this Office; and that said Letters Patent should be read with this correction therein that the same may conform to the record of the case in the Patent Office.

Signed, countersigned, and sealed this 20th day of November, A. D. 1894.

[SEAL.]

JNO. M. REYNOLDS,
*Assistant Secretary of the Interior.*

Countersigned:
S. T. FISHER,
*Acting Commissioner of Patents.*